Patented Apr. 5, 1932

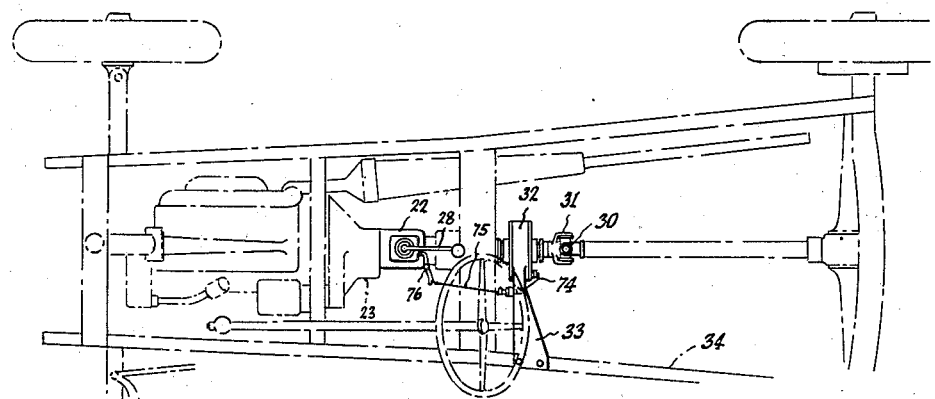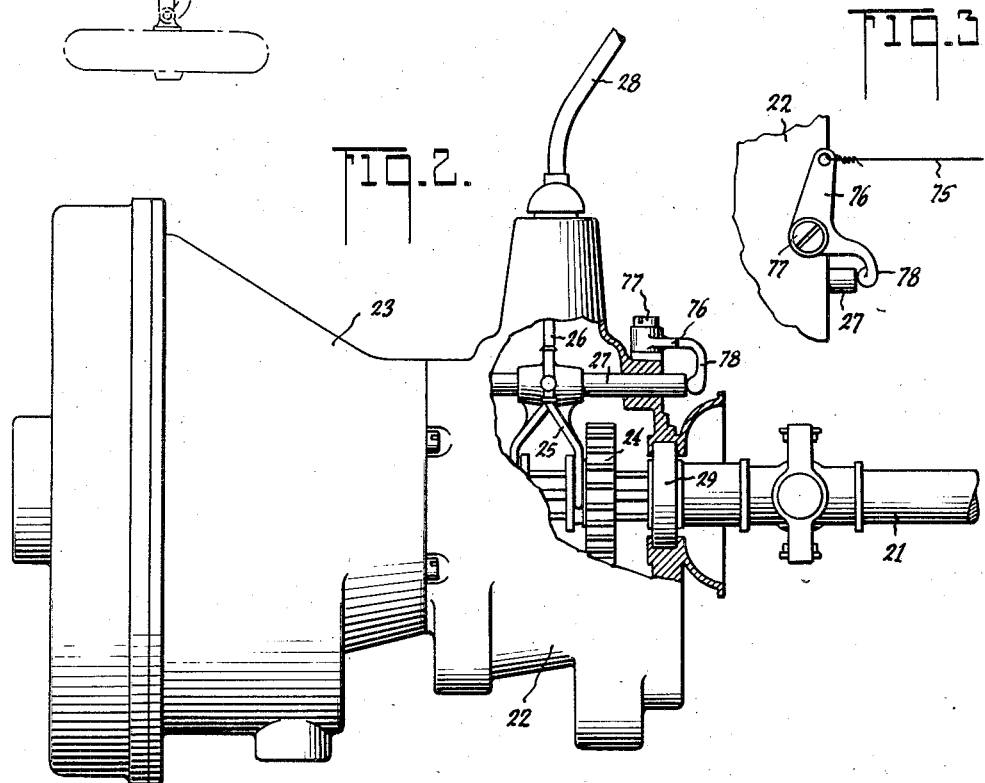

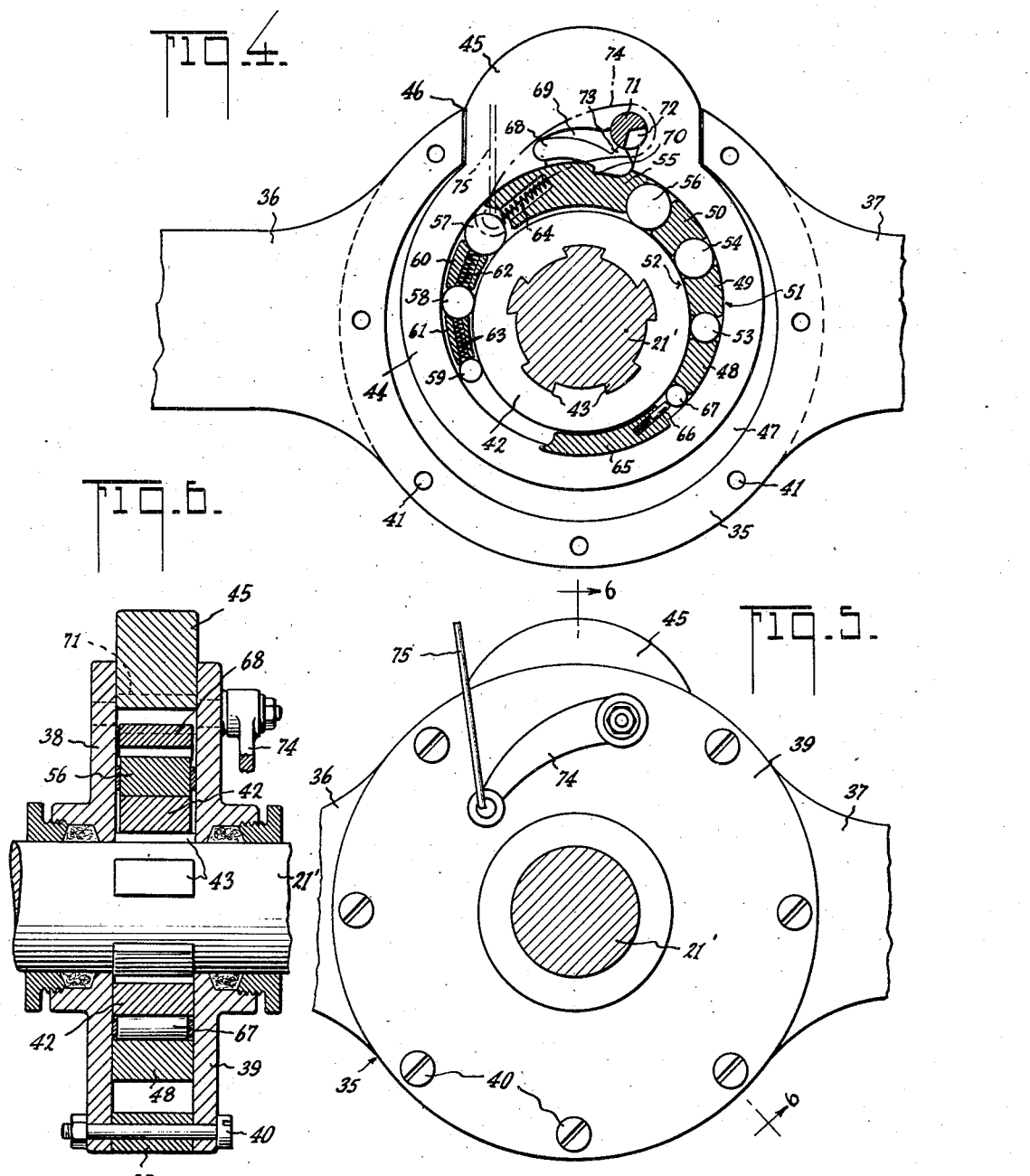

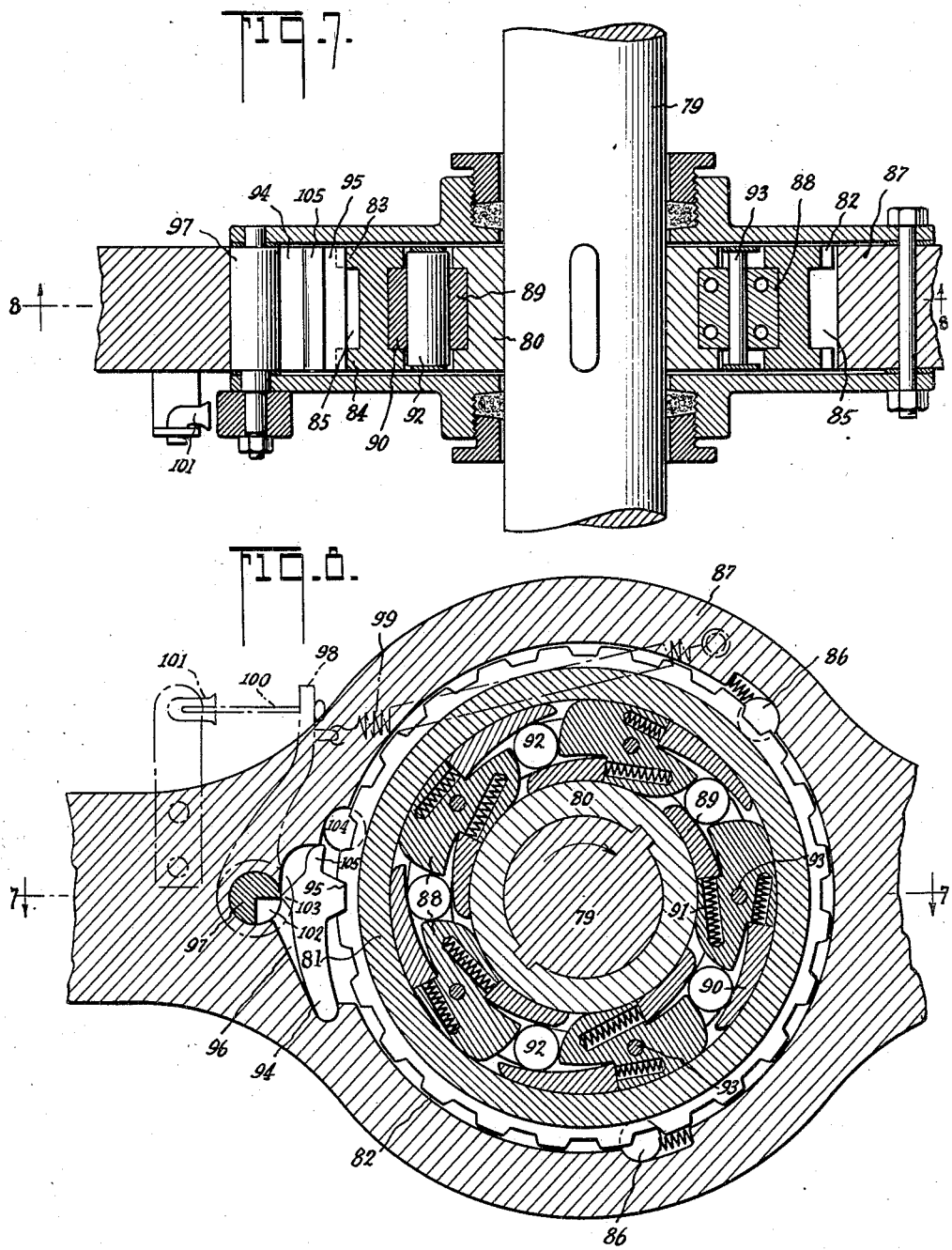

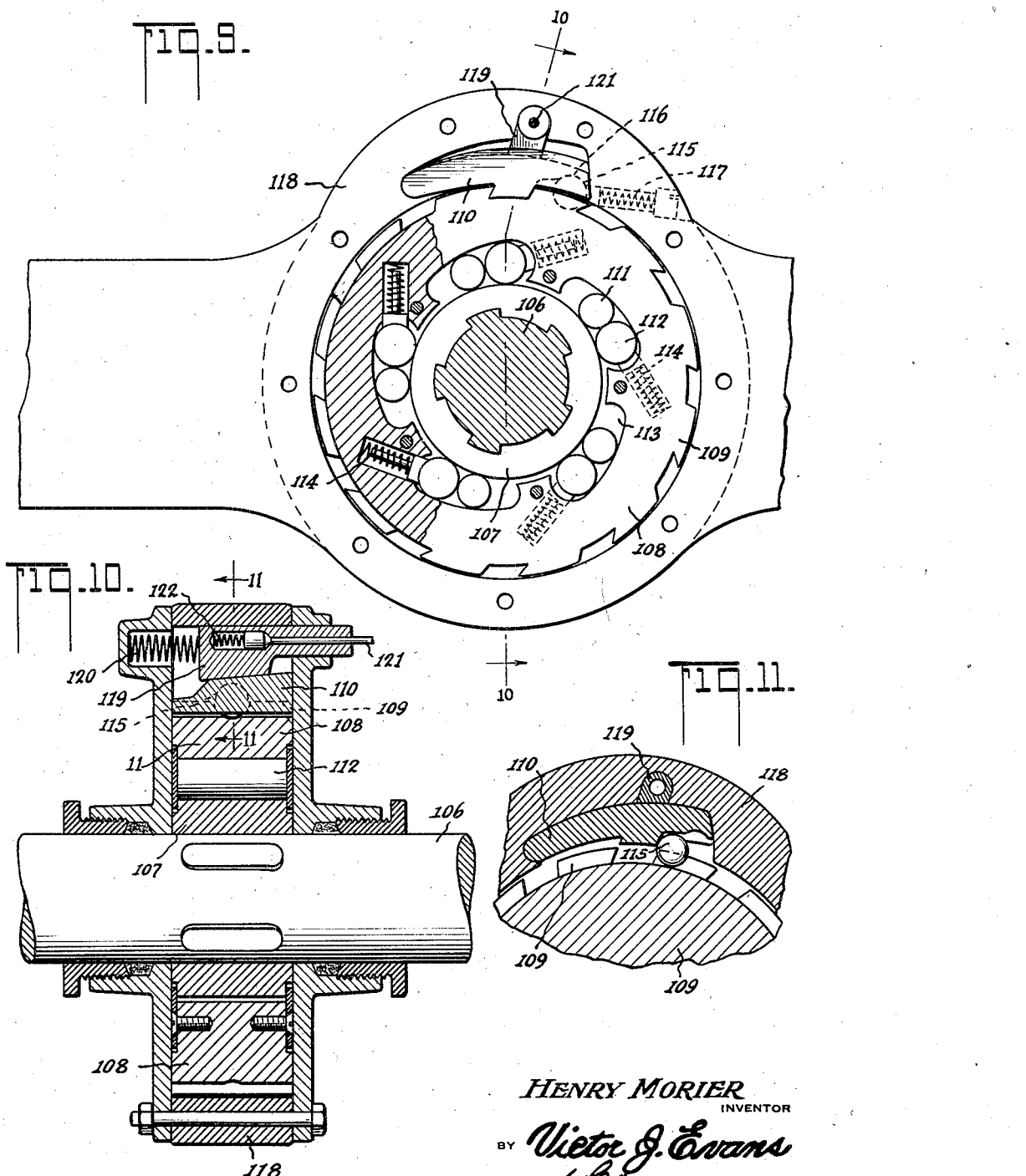

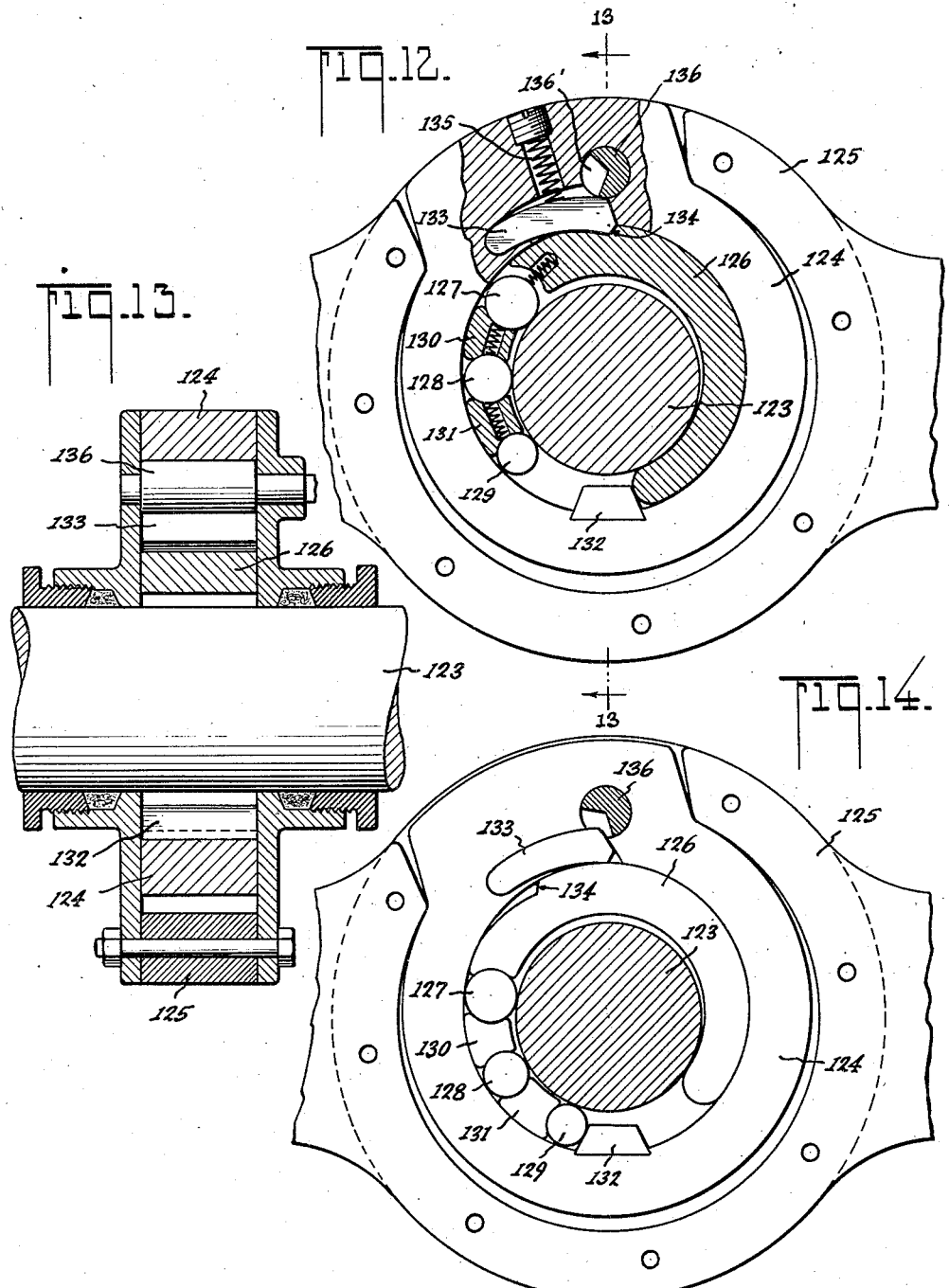

1,852,935

UNITED STATES PATENT OFFICE

HENRY MORIER, OF PLAINVILLE, CONNECTICUT

SAFETY TRANSMISSION BRAKE

Application filed March 14, 1931. Serial No. 522,657.

This invention relates to power transmission devices, and more particularly to mechanism of this character including a uni-directional power driven shaft equipped with clutch or transmission means for imparting movement to a drive shaft or the like, at one or more different speeds and in one or the other direction. Such power transmission devices are commonly employed in automobiles and the like.

The primary object of the present invention is to provide novel and improved safety brake means for automatically locking the drive shaft against movement in a direction opposite to the uni-directional movement of the power shaft whenever the power shaft is disconnected from the drive shaft, or whenever the direction of rotation of the power shaft is reversed by reason of back-firing of the engine connected to the power shaft, or by reason of the vehicle rolling backward on a hill or other inclined surface. The present apparatus involves features of improvement over the devices disclosed in prior Patent No. 1,788,317, dated January 6, 1931, and copending application Serial No. 409,918, filed November 26, 1929, by the present applicant and Henry Comtois.

Another object of the invention is to provide a safety brake means for motor vehicles and the like which will be positively acting at all times, which will not interfere with or be affected by shifting of the transmission gears to different speeds, except to be released when the vehicle moves forward, and which will be controlled by the gear shifting means so that shifting of the gears to permit backward movement of the vehicle will automatically release the safety braking means and allow reversal of the drive shaft.

Other objects and advantages of the invention will be hereinafter specially pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings:

Fig. 1 is a top plan view of an automobile chassis illustrating one application of the present invention;

Fig. 2 is a side elevation, partly in section, of an automobile transmission casing, showing the control means for the automatic braking means;

Fig. 3 is a detail top plan view showing the connection between the control means and the automatic braking means;

Fig. 4 is a transverse vertical sectional view showing one form of the automatic brake;

Fig. 5 is an end elevation showing the casing for the device as illustrated in Fig. 4;

Fig. 6 is a vertical sectional view through the automatic brake casing, taken on the line 6—6 of Fig. 5;

Fig. 7 is a horizontal sectional view through another form of the apparatus, taken on the line 7—7 of Fig. 8;

Fig. 8 is a vertical sectional view taken on the line 8—8 of Fig. 7;

Fig. 9 is a vertical sectional view through still another form of the invention;

Fig. 10 is a vertical sectional view on the line 10—10 of Fig. 9, showing one of the locking dogs in its inoperative position;

Fig. 11 is a detail sectional view taken on the line 11—11 of Fig. 10;

Fig. 12 is a vertical sectional view through a further modified form of the invention;

Fig. 13 is a vertical sectional view on the line 13—13 of Fig. 12; and

Fig. 14 is a view similar to Fig. 12, showing the parts in position to permit reverse movement of the shaft.

The safety transmission brake in this instance is shown in one of its applications to power transmission devices wherein the same is particularly useful, viz., in connection with the transmission of an automobile engine or power plant 20, having a power shaft operatively connected to a driven shaft, here termed the main drive shaft 21, suitable selective sliding gear transmission and clutch mechanism being provided and housed in a gear shift casing 22 connected to the transmission housing 23. The transmission includes the usual sliding speed gears here indicated generally at 24, and gear shifter fork 25 connected to the gear control or shifter rod 26 slidable on a guide rod 27 and operated by the usual gear shift lever 28. The main drive shaft 21 is journaled in a bearing 29 at the end of the gear shaft casing 22 and is provided with the usual universal joint 30 and universal joint housing 31.

The safety transmission brake in this instance is positioned at any desired suitable location on the main drive shaft 21, preferably between the gear shift casing 22 and the universal joint 30, as indicated at 32 in Fig. 1, suitable flange or bracket means 33 being provided to secure the safety brake casing to the chassis or frame 34 of the vehicle. The safety brake is thus adapted to operate automatically at all times except when the gear shift lever 28 is operated to permit reversal of movement of the main shaft 21, and is not affected by shifting of the transmission gears from one speed to another.

Referring to the form of the invention shown in Figs. 4 to 6, inclusive, the safety transmission brake includes a cylindrical housing 35 positioned around the shaft 21', and having supporting brackets 36 and 37 and front and rear cover plates 38 and 39 secured together by suitable bolts 40 extending through bolt holes 41 provided in the housing 35. A concentric ring or collar member 42 is keyed to the shaft 21' as indicated at 43. This concentric collar 42 is surrounded by an eccentrically arranged ring member 44 having an offset portion 45 extending through an opening 46 provided in the housing 35, the ring member 44 being adapted for up and down movement within the interior 47 of the housing 35 in a manner presently to be explained.

A plurality of wedge blocks 48, 49 and 50, of progressively increasing height, are interposed between the collar 42 and ring member 44, these wedge blocks having upper and lower cam surfaces 51 and 52 respectively adapted to engage the inner wall of the ring member 44 and the periphery of the collar 42, respectively. These wedge blocks 48, 49 and 50 are separated by rollers 53 and 54. An arcuate cam block 55 adjoins the wedge block 50, a roller 56 being interposed between the cam block 55 and the wedge block 50. A plurality of balancing rollers 57, 58 and 59 are provided at the opposite side of the collar 42, to maintain the eccentricity of the ring member 44 with respect to the collar 42. The balancing rollers 57, 58 and 59 are separated by spacer blocks 60 and 61, these spacer blocks 60 and 61 having springs 62 and 63 which tend normally to separate the rollers 57, 58 and 59. The cam block 55 is provided with a spring 64 to normally maintain the cam block 55 and roller 57 in spaced relation. A key block 65 is secured to the inner side of the ring member 44 to limit the movement of the several wedge blocks, as well as the cam block and balancing rollers, this key block 65 being provided with a spring pressed plunger 66 which engages a roller 67 adapted to abut against the end of the wedge block 48.

To lock the shaft 21' against unintentional reverse movement, brought about either by a rearward movement of the vehicle while on a hill, a dog 68 is loosely mounted in a recess 69 formed in the offset portion 45 of the ring member 44, this dog 68 being adapted to interlock in a groove 70 formed in the outer surface of the cam block 55. A locking pin 71 extends transversely through the housing, and through the recess 69, this locking pin having a cut-out portion 72 at one side. This cut-out portion 72 is adapted to receive the upper end portion 73 of the dog 68 when the pin 71 is moved to one of its positions, whereby the dog 68 will release the cam block 65 to permit rotation of the shaft 21' in the reverse direction. The locking pin 71 is provided with an operating arm 74, this operating arm 74 being connected, by means of a cable 75, with a bell crank lever 76 mounted on a gear casing 22, as indicated at 77, one of the arms 78 being arranged to be engaged by the end of the guide rod 27 which projects from the gear casing 22.

The operation of the construction above described is as follows. The parts are normally in the position shown in Fig. 4, with the shaft 21' rotating in an anti-clockwise direction as viewed in said figure. If the vehicle should be halted on a hill, with the brakes released, so that the vehicle moves rearwardly, the shaft 21' will tend to reverse its direction of movement. This will cause the collar 42 to rotate the rollers 67, 53 and 54, which will move the wedge blocks 48, 49 and 50 into tight wedging engagement between the collar 42 and the ring member 44, so that the shaft 21' will be prevented from rotating in said reverse direction. Movement of the vehicle forwardly will restore the parts to the normal position. If the operator of the vehicle desires to move the vehicle rearwardly he will naturally set the transmission in reverse. The bell crank lever 76 is so arranged that when the gear shift lever 28 is set for reverse the guide rod 27 will engage and rock the lever 76, thus drawing upon the cable 75 and arm 74. This will rock the locking pin 71 so that the end portion 73 of the dog 68 can move into the groove 72, out of the path of the cam block 55. Thus, when the shaft 21' rotates in the reverse, or counter-clockwise direction, as viewed in Fig. 4, the springs 63, 62 and 64 will become effective to move the cam block 55 and the rollers and wedge blocks in front of the cam block in a clockwise direction until the roller 67 rests substantially against the end of the key block 65. Thus there is no wedging action upon the collar 42 and the shaft 21' will hence rotate freely in the reverse direction. When the gear shift lever 28 is operated for forward movement of the vehicle, the locking pin 71 will be rocked to engage the dog 68 and the dog 68 will find its way into the groove 70; and any subsequent reverse movement of the shaft for any cause will cause the wedge blocks 48, 49 and 50 to operate in the manner already described.

Referring to Figs. 7 and 8 of the drawings I illustrate a modification of the invention in which the shaft 79 is keyed to a concentric ring 80 and is surrounded by a locking ring 81 having a plurality of teeth 82 along its periphery, the teeth 82 being arranged in inner and outer rows 83 and 84, with a groove 85 between the rows 83 and 84. A plurality of spring held balancing rollers 86 are interposed between the ring member 81 and the housing 87. To prevent unintentional reverse movement of the shaft 79 a plurality of spacing blocks 88 are interposed between the collar 80 and the ring member 81. Each of the spacing blocks 88 is provided with a plurality of oppositely facing cam blocks 89 and 90, springs 91 being provided to normally maintain the cam blocks 89 and 90 in a position away from the spacing blocks 88. The cam blocks 89 are provided with cam surfaces to engage the periphery of the collar 80 and the cam blocks 90 have cam surfaces to engage the inside of the ring 81. Rollers 92 are interposed between the ends of adjacent spacer blocks 88 as well as between the inner cam block 89 of one spacing block 88 and the outer cam block 90 of the adjacent spacing block 88. The spacing blocks 88 are pivotally mounted as indicated at 93. A dog 94 having a locking tooth 95, is loosely mounted in a space 96 provided within the housing 87, the tooth 95 of the dog 94 being adapted to lodge in one of the interstices between the teeth 82 of the ring member 81. A locking pin 97 extends transversely through the housing 87, the locking pin 97 being provided with an operating arm 98 normally held in position by means of a spring 99, so that the locking pin engages the dog 94 as shown in Fig. 8 to maintain the dog in interlocking relation with the ring member 81. The arm 98 is connected to a cable 100 which may in turn be connected to a flexible shaft or the like 101, operatively connected to be actuated by means of the gear shift lever 28 and bell crank 76 as in the modification previously described.

In the operation of the construction shown in Figs. 7 and 8 the parts are normally in the position shown with the shaft 79 rotating in the direction indicated by the arrow. It will be seen that this rotative movement of the shaft will move the cam blocks 89 toward the spacing blocks 88, against the tension of the springs 91, this movement also tending to rotate the rollers 92 in the opposite direction. The frictional engagement between the rollers 92 and the ends of adjacent spacing blocks 88 and cam blocks 90 tends to also move the cam blocks 90 toward their respective spacing blocks 88. When, however, the shaft 79 is unintentionally reversed, the springs 91 will force the cam blocks 89 and 90 outwards, away from the spacing blocks 88, thus producing a wedging engagement between the collar 80 and the ring member 81. The ring member 81 it will be seen is locked against rotation by means of the dog 94 which is held against the teeth 82 by means of the locking pin 97. Reverse rotation of the shaft 79 is thus immediately restrained. When, however, the operator operates the gear shift lever to move the vehicle rearwardly, the locking pin 97 will be turned to present the groove 102 toward the dog 94 so that the upper end portion 103 may enter the groove 102. Thus, even though this intentional reverse movement causes the collar 80 to be locked to the ring member 81 in the manner already described, the ring member 81 will itself rotate in the housing 87. During this reverse rotation of the shaft 79 and ring member 81, a roller 104 will be moved beneath the toe 105 of the dog 94 to prevent the dog 94 from lodging between the teeth 82, but will be freed from such engagement upon the shaft being subsequently rotated forwardly, when it will carry the ring member in that direction. When the vehicle transmission is adjusted to neutral, or in forward speed, the locking pin 97 will cause the dog 94 to again lodge between the teeth 82 and the parts will then be in position to prevent unintentional reverse movement of the shaft 79. In Figs. 9, 10, and 11 I illustrate another modification of the invention in which the shaft 106 is keyed to a collar 107 and is surrounded by a locking ring 108 having a plurality of teeth 109 adapted to be engaged by a dog 110 in substantially the same manner as in the form shown in Figs. 7 and 8. In this instance, however, the locking of the ring 108 to the collar 107 is accomplished by means of a plurality of small and large rollers 111 and 112 positioned in cam recesses 113, these rollers being provided with springs 114 which tend to normally urge the rollers into wedging engagement between the periphery of the collar 107 and the surfaces of the cam recesses 113. In the operation of this form of the device rotation of the shaft 106 in a forward direction will tend to move the rollers 111 and 112 into the larger portions of the cam recesses so that the collar 107 will rotate freely within the locking ring 108. Unintentional reverse movement of the shaft 106 will immediately move the rollers 111 and 112 into the smaller portions of the cam recesses thus wedging the collar 107 and locking ring 108 together and preventing reverse rotation of the shaft 106, by reason of the engagement of the dog 110 against the teeth 109 of the locking ring 108. Intentional reverse movement of the shaft 106 is accomplished by releasing the dog 110, whereupon a ball 115 will be forced beneath the toe portion 116 of the dog 110 by means of a spring 117, so that the locking ring 108 while it is locked to the collar 107 will rotate freely within the housing 118. The ball 115 will be released from the dog upon forward motion being imparted to the shaft, when it will be caused to roll out from under the toe of the latter against the slight pressure provided by the spring 117.

In the form of the invention shown in Figs. 9, 10 and 11 the locking dog 110 is adapted to be released by means of a wedge member 119 which is adapted to be moved inwardly against its retaining spring 120 by means of an operating rod 121 which extends into the wedge member 119 and has a spring 122 to provide flexibility of movement for the wedge member 119. The operating rod 121 is connected to the bell crank lever 76, or other equivalent operating device, in any desired manner.

In Figs. 12, 13 and 14 I illustrate still another modification of the invention in which the shaft 123 is surrounded by an eccentric block 124 positioned in a housing 125. An arcuate wedge cam 126 is interposed between the shaft 123 and the eccentric block 124, together with a plurality of locking rollers 127, 128 and 129 separated by spacing blocks 130 and 131. A key block 132 is secured to the inner surface of the eccentric block 124, between the narrow end of the wedge cam 126 and the smallest lock roller 129. The parts are normally held in the position shown in Fig. 12 by means of a dog 133 which is held against a shoulder 134 provided on the cam wedge member 126 by means of a spring 135. A locking pin 136 is provided to normally lock the dog 133 against the cam wedge member 126, this locking pin 136 being operated in the same manner as the locking pins of the modifications already described. An unintentional reverse movement of the shaft 123 in a counter-clockwise direction as viewed in Fig. 12, will cause the shaft to move the locking rollers 127, 128 and 129 into wedging engagement between the shaft 123 and the eccentric block 124 thus locking the shaft 123 to the eccentric block 124 and preventing rotation of the shaft. When it is desired to reverse the movement of the shaft 123, the locking pin 136 will be operated to present the groove 136′ for reception of the upper end of the dog 133. Frictional engagement between the shaft 123 and the cam wedge member 126 will cause the cam wedge member 126 to move past the dog 133 to the position shown in Fig. 14. The eccentricity of the annular recess between the eccentric block 124 and the shaft 123 is thus reduced so that there will be no locking or welding engagement between the rollers 127, 128 and 129, and the shaft 123 will rotate freely within the eccentric block 124. It will be understood that the construction is arranged so that the eccentric block 124 will move inwardly in the housing, a slight distance, to reduce the eccentricity of the space between the shaft and eccentric block just referred to. The key block 132 functions as an abutment to limit the movement of the cam wedge member and rollers within the eccentric block 124 in each direction. A forward motion of the vehicle will cause the locking pin 136 to release the dog 133, and rotation of the shaft 123 will restore the parts to the position shown in Fig. 12.

The eccentric rings or blocks 44 (Fig. 4) and 124 (Fig. 12) are equally adaptable for use with the constructions shown in the prior patent and application referred to in the second paragraph of this specification.

Considerable particularities of description, as to materials, part details, dimensions, capacities and utilities may have been herein indulged in, but it will be understood that these statements, made with particular reference to the embodiments of the invention illustrated in the drawings, are not in any way to be taken as definitive or limitative of the invention. Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

What I claim is:

1. A safety transmission brake including the combination with a uni-directional power shaft, a drive shaft and power transmitting means between said shafts, of a housing surrounding said drive shaft, a collar secured to said shaft within said housing, a ring member surrounding said collar, devices interposed between said collar and ring member arranged to lock said collar and ring member together against relative rotation and means to restrain unintentional reverse movement of said drive shaft, said means including a locking dog operatively associated with said ring member and means for releasing said locking dog, said releasing means arranged to normally hold said dog in locking position, said power transmitting means including a drive shaft reversing device, and means operatively connecting said reversing device and said releasing means to release said locking dog from its locking engagement, whereby to permit reverse movement of said drive shaft.

2. A safety transmission brake including the combination with a uni-directional power shaft, a drive shaft and power transmitting means between said shafts, of a housing surrounding said drive shaft, a collar secured to said shaft within said housing, a ring member surrounding said collar, devices interposed between said collar and ring member arranged to lock said collar and ring member together against relative rotation and means to restrain unintentional reverse movement of said drive shaft, said means including a locking dog operatively associated with said ring member and means for releasing said locking dog, said releasing means including a locking pin arranged to normally hold said dog in locking position, said power transmitting means including a drive shaft reversing device, means operatively connecting said reversing device and said locking pin and adapted to move said locking pin out of locking engagement with said dog on operation of said reversing device, whereby to release said dog and permit reverse movement of said drive shaft.

3. A safety transmission brake including the combination with a uni-directional power shaft, a drive shaft, and power transmitting means between said shafts, of a housing surrounding said drive shaft, a ring member eccentrically positioned around said drive shaft, said ring member having an offset portion extending through said housing, a plurality of wedge blocks, of progressively increasing height, interposed between said drive shaft and said ring member, said wedge blocks having upper and lower cam surfaces whereby to lock said ring member to said drive shaft, rollers separating said wedge blocks, an arcuate cam block adjoining said wedge blocks, a key block to normally limit movement of said wedge blocks in one direction, a dog loosely mounted in said ring member and adapted to engage said arcuate cam block, means to normally hold said dog in locking engagement with said arcuate cam block, and to release said dog from said cam block and permit reverse movement of said drive shaft.

4. A safety transmission brake including the combination with a uni-directional power shaft, a drive shaft, and power transmitting means between said shafts, of a housing surrounding said drive shaft, a collar secured to said shaft within said housing, a ring member eccentrically positioned around said collar, said ring member having an offset portion extending through said housing, a plurality of wedge blocks, of progressively increasing height, interposed between said collar and said ring member, said wedge blocks having upper and lower cam surfaces to engage the inner wall of the ring member and the periphery of said collar, rollers separating said wedge blocks, an arcuate cam block adjoining said wedge blocks, a key block to normally limit movement of said wedge blocks in one direction, a dog loosely mounted in said ring member and adapted to engage said arcuate cam block, means to normally hold said dog in locking engagement with said arcuate cam block, and means controlled by said power transmitting means to release said dog from said cam block and permit reverse movement of said drive shaft.

5. A safety transmission brake including the combination with a uni-directional power shaft, a drive shaft, and power transmitting means between said shafts, of a housing surrounding said drive shaft, a collar secured to said shaft within said housing, a ring member eccentrically positioned around said collar, said ring member having an offset portion extending through said housing, a plurality of wedge blocks, of progressively increasing height, interposed between said collar and said ring member, said wedge blocks having upper and lower cam surfaces to engage the inner wall of the ring member and the periphery of said collar, rollers separating said wedge blocks, an arcuate cam block adjoining said wedge blocks, a key block to normally limit movement of said wedge blocks in one direction, a dog loosely mounted in said ring member and adapted to engage said arcuate cam block, a locking pin adapted to normally hold said dog in locking engagement with said arcuate cam block, said locking pin having a recess at one side, means operatively connecting said power transmitting means and said locking pin and adapted to move said locking pin out of locking engagement with said dog on operation of said reversing device, whereby a portion of said dog is adapted to enter said locking pin recess to release said dog from said cam block and permit reverse movement of said drive shaft.

6. A safety transmission brake including the combination with a uni-directional power shaft, a drive shaft, and power transmitting means between said shafts, of a housing surrounding said drive shaft, a collar secured to said shaft within said housing, a ring member eccentrically positioned around said collar, said ring member having an offset portion extending through said housing, a plurality of wedge blocks, of progressively increasing height, interposed between said collar and said ring member, said wedge blocks having upper and lower cam surfaces to engage the inner wall of the ring member and the periphery of said collar, rollers separating said wedge blocks, an arcuate cam block adjoining said wedge blocks, a key block to normally limit movement of said wedge blocks in one direction, a dog loosely mounted in said ring member and adapted to engage said arcuate cam block, a locking pin adapted to normally hold said dog in locking engagement with said arcuate cam block, said locking pin having a recess at one side, said power transmitting means including a drive shaft reversing device, means operatively connecting said reversing device and said locking pin and adapted to move said locking pin out of locking engagement with said dog on operation of said reversing device, whereby a portion of said dog is adapted to enter said locking pin recess to release said dog from said cam block and permit reverse movement of said drive shaft.

7. A safety transmission brake including the combination with a uni-directional power shaft, a drive shaft, and power transmitting means between said shafts, of a housing surrounding said drive shaft, a ring member surrounding said drive shaft, devices interposed between said ring member and said drive shaft adapted to lock said ring member to said drive shaft and restrain unintentional reverse movement of said drive shaft, a plurality of teeth on the periphery of said ring member, a locking dog positioned in said housing and normally engaging said teeth, a locking pin adapted to normally hold said dog in locking engagement with teeth of said ring member, said devices being effective on reversal of movement of said drive shaft to lock said drive shaft and ring member together and restrain reverse movement of said drive shaft, said power transmitting means including a drive shaft reversing device, means operatively connecting said reversing device and said locking pin and adapted to move said locking pin out of locking engagement with said dog on operation of said reversing device, whereby to release said dog from said ring member and permit reverse movement of said drive shaft.

8. A safety transmission brake including the combination with a uni-directional power shaft, a drive shaft, and power transmitting means between said shafts, of a housing surrounding said drive shaft, a ring member surrounding said drive shaft, devices interposed between said ring member and said drive shaft and adapted to lock said ring member to said drive shaft and restrain unintentional reverse movement of said drive shaft, said devices including a plurality of upper and lower oppositely facing cam blocks, rollers interposed between said cam blocks, a plurality of teeth on the periphery of said ring member, a locking dog positioned in said housing and normally engaging said teeth, a locking member adapted to normally hold said dog in locking engagement with teeth of said ring member, said rollers and cam blocks being effective on reversal of movement of said drive shaft to lock said drive shaft and ring member against relative movement whereby to restrain reverse movement of said drive shaft, and means to move said locking member out of locking engagement with said dog, whereby to release said dog from said ring member and permit reverse movement of said drive shaft.

9. A safety transmission brake including the combination with a uni-directional power shaft, a drive shaft, and power transmitting means between said shafts, of a housing surrounding said drive shaft, a collar secured to said shaft, a ring member surrounding said collar, devices interposed between said ring member and said collar and adapted to lock said ring member to said collar and restrain unintentional reverse movement of said drive shaft, said devices including a plurality of upper and lower oppositely facing cam blocks, rollers interposed between said upper and lower oppositely facing cam blocks, a plurality of teeth on the periphery of said ring member, a locking dog positioned in said housing and normally engaging said teeth, a locking member adapted to normally hold said dog in locking engagement with teeth of said ring member, said rollers and cam blocks being effective on reversal of movement of said drive shaft to lock said collar and ring member together and restrain reverse movement of said drive shaft, means operatively connecting said power transmitting means and said locking member and adapted to move said locking member out of locking engagement with said dog whereby to release said dog from said ring member and permit reverse movement of said drive shaft.

10. A safety transmission brake including the combination with a uni-directional power shaft, a drive shaft, and power transmitting means between said shafts, of a housing surrounding said drive shaft, a collar secured to said shaft, a ring member surrounding said collar, devices interposed between said ring member and said collar and adapted to lock said ring member to said collar and restrain unintentional reverse movement of said drive shaft, said devices including a plurality of spacing blocks pivotally mounted within said housing, a plurality of upper and lower oppositely facing cam blocks associated with said spacing blocks, rollers interposed between said spacing blocks and between said upper and lower oppositely facing cam blocks, a plurality of teeth on the periphery of said ring member, a locking dog positioned in said housing and normally engaging said teeth, a locking pin adapted to normally hold said dog in locking engagement with teeth of said ring member, said rollers and cam blocks being effective on reversal of movement of said drive shaft to lock said collar and ring member together and restrain reverse movement of said drive shaft, said power transmitting means including a drive shaft reversing device, means operatively connecting said reversing device and said locking pin adapted to move said locking pin out of locking engagement with said dog on operation of said reversing device, whereby to release said dog from said cam block and permit reverse movement of said drive shaft.

11. A safety transmission brake including the combination with a uni-directional power shaft, a drive shaft, and power transmitting means between said shafts, of a housing surrounding said drive shaft, a ring member surrounding said drive shaft, devices interposed between said ring member and said drive shaft and adapted to lock said ring member relative to said drive shaft and restrain unintentional reverse movement of said drive shaft, said devices including a plurality of wedging rollers a plurality of teeth on the periphery of said ring member, a locking dog positioned in said housing and normally engaging said teeth, a locking member adapted to normally hold said dog in locking engagement with teeth of said ring member, and wedging rollers effective on reversal of movement of said drive shaft to lock said drive shaft and ring member together and restrain reverse movement of said drive shaft.

12. A safety transmission brake including the combination with a uni-directional power shaft, a drive shaft, and power transmitting means between said shafts, of a housing surrounding said drive shaft, a collar secured to said shaft, a ring member surrounding said collar, a plurality of wedging rollers interposed between said ring member and said collar and adapted to lock said ring member to said collar and restrain unintentional reverse movement of said drive shaft, a plurality of teeth on the periphery of said ring member, a locking dog positioned in said housing and normally engaging said teeth, a locking pin adapted to normally hold said dog in locking engagement with teeth of said ring member, said wedging rollers being effective on reversal of movement of said drive shaft to lock said collar and ring member together and restrain reverse movement of said drive shaft, and means operatively connecting said power transmitting means and said locking pin and adapted to move said locking pin out of locking engagement with said dog whereby to release said dog from said ring member and permit reverse movement of said drive shaft.

13. A safety transmission brake including the combination with a uni-directional power shaft, a drive shaft, and power transmitting means between said shafts, of a housing surrounding said drive shaft, a collar secured to said shaft, a ring member surrounding said collar, devices interposed between said ring member and said collar and adapted to lock said ring member to said collar and restrain unintentional reverse movement of said drive shaft, a plurality of teeth on the periphery of said ring member, a locking dog positioned in said housing and normally engaging said teeth, a locking pin adapted to normally hold said dog in locking engagement with teeth of said ring member, said devices being effective on reversal of movement of said drive shaft to lock said collar and ring member together and restrain reverse movement of said drive shaft, said power transmitting means including a drive shaft reversing device, means operatively connecting said reversing device and said locking pin and adapted to move said locking pin out of locking engagement with said dog on operation of said reversing device. whereby to release said dog from said ring member and permit reverse movement of said drive shaft.

14. A safety transmission brake including the combination with a uni-directional power shaft, a drive shaft, and power transmitting means between said shafts, of a housing surrounding said drive shaft, an eccentric block surrounding said drive shaft, devices interposed between said eccentric block and said drive shaft adapted to lock said eccentric block to said drive shaft and restrain unintentional reverse movement of said drive shaft, a locking dog positioned in said housing and normally engaging one of said interposed devices, means to normally hold said dog in locking engagement with said dog engaged interposed device to restrain reverse movement of said drive shaft, and means to move said dog holding means out of locking engagement with said dog whereby to release said interposed devices and permit reverse movement of said drive shaft.

15. A safety transmission brake including the combination with a uni-directional power shaft, a drive shaft, and power transmitting means between said shafts, of a housing surrounding said drive shaft, an eccentric block surrounding said drive shaft, within said housing, wedging devices interposed between said eccentric block and said drive shaft adapted to lock said eccentric block to said drive shaft and restrain unintentional reverse movement of said drive shaft, a locking dog positioned in said eccentric block and normally engaging one of said wedging devices, a locking member to normally hold said dog in locking engagement with said engaged wedging device, said wedging devices being effective on reversal of movement of said drive shaft to lock said drive shaft and eccentric block together and restrain reverse movement of said drive shaft, means operatively connecting said power transmitting means and said locking member and adapted to move said locking member out of locking engagement with said dog whereby to release said dog and render said wedging devices ineffective and thereby permit reverse movement of said drive shaft.

16. A safety transmission brake including the combination with a uni-directional power shaft, a drive shaft, and power transmitting means between said shafts, of a housing surrounding said drive shaft, an eccentric block, surrounding said drive shaft, devices interposed between said eccentric block and said drive shaft and adapted to lock said eccentric block to said drive shaft and restrain unintentional reverse movement of said drive shaft, said devices including an arcuate wedge cam, a plurality of locking rollers, and spacing blocks separating said rollers, a key block to limit movement of said interposed devices, a locking dog positioned in said eccentric block and normally engaging said arcuate wedge cam, a locking pin adapted to normally hold said dog in locking engagement with said arcuate wedge cam, said arcuate wedge cam and locking rollers being effective on reversal of movement of said drive shaft to lock said drive shaft and eccentric block together and restrain reverse movement of said drive shaft, said power transmitting means including a drive shaft reversing device, means operatively connecting said reversing device and said locking pin and adapted to move said locking pin out of locking engagement with said dog on operation of said reversing device, whereby to release said arcuate wedge cam and locking rollers and permit reverse movement of said drive shaft.

17. A safety transmission brake including the combination with a power shaft, a drive shaft and means to connect and disconnect said power shaft and said drive shaft, of a ring member surrounding said drive shaft, and a collar keyed to said drive shaft, wedge devices interposed between said collar and ring member arranged to lock said drive shaft and ring member together against relative rotation and to restrain unintentional reverse movement of said drive shaft, and means associated with said first named means to render said wedge devices ineffective.

In testimony whereof I hereby affix my signature.

HENRY MORIER.